United States Patent [19]

Satomi et al.

[11] Patent Number: 5,603,155
[45] Date of Patent: Feb. 18, 1997

[54] METHOD OF MANUFACTURING AN IRON CORE OF A MULTI-PHASE LINEAR MOTOR

[75] Inventors: Hirobumi Satomi; Takao Iwasa, both of Kashiwa, Japan

[73] Assignee: Oriental Motor Co., Ltd., Tokyo, Japan

[21] Appl. No.: 325,603

[22] Filed: Oct. 19, 1994

[30] Foreign Application Priority Data

Oct. 22, 1993 [JP] Japan .................. 5-264516

[51] Int. Cl.⁶ ........................ H02K 15/02
[52] U.S. Cl. .............. 29/598; 29/596; 29/609; 29/732; 29/738
[58] Field of Search ............ 29/596, 598, 609, 29/732, 738

[56] References Cited

U.S. PATENT DOCUMENTS

| 2,192,244 | 3/1940 | Schlesinger | 164/87 |
|---|---|---|---|
| 4,635,351 | 1/1987 | Koch et al. | 29/598 |
| 5,349,741 | 9/1994 | Neuenschwander | 29/598 |
| 5,406,243 | 4/1995 | Jenkins et al. | 29/738 X |

FOREIGN PATENT DOCUMENTS

| 0319096 | 6/1989 | European Pat. Off. . |
|---|---|---|
| 1926065 | 3/1970 | Germany . |
| 6-197517 | 7/1994 | Japan . |
| 6-189520 | 7/1994 | Japan . |

OTHER PUBLICATIONS

Patent Abstracts of Japan, vol. 6, No. 6 (E-89) (884), Jan. 14, 1982 & JP-A-56 129 556 (Tokyo Shibaura).

Primary Examiner—Carl E. Hall
Attorney, Agent, or Firm—Jacobson, Price, Holman & Stern, PLLC

[57] ABSTRACT

An iron core of a multi-phase linear motor which is not restricted by the shape of the motor is manufactured. A stator 1 and a mover 2 are disposed opposite to each other and are separated by an air gap. In manufacturing of the iron core of the multi-phase linear motor having a multiplicity of teeth 16 formed on surfaces of a plurality of salient poles P1, P2, ... disposed in the stator 1 or the motor 2, the stator iron core 10 or mover iron cores 22a and 22b are formed by punching iron plates 30a, 30b, ... forming the iron core by a punching mold 31 while selectively controlling actuation and withdrawal of movable punches 33 included in the punching mold 31 and disposed so as to be actuable and withdrawable toward and away from the salient poles so that the tips of the salient poles P1, P2, ... form tooth tops 16a or tooth bottoms 16b of the teeth 16 at a predetermined period for each punching of the iron plates and by laminating the punched iron plates successively.

6 Claims, 8 Drawing Sheets

FIG. I

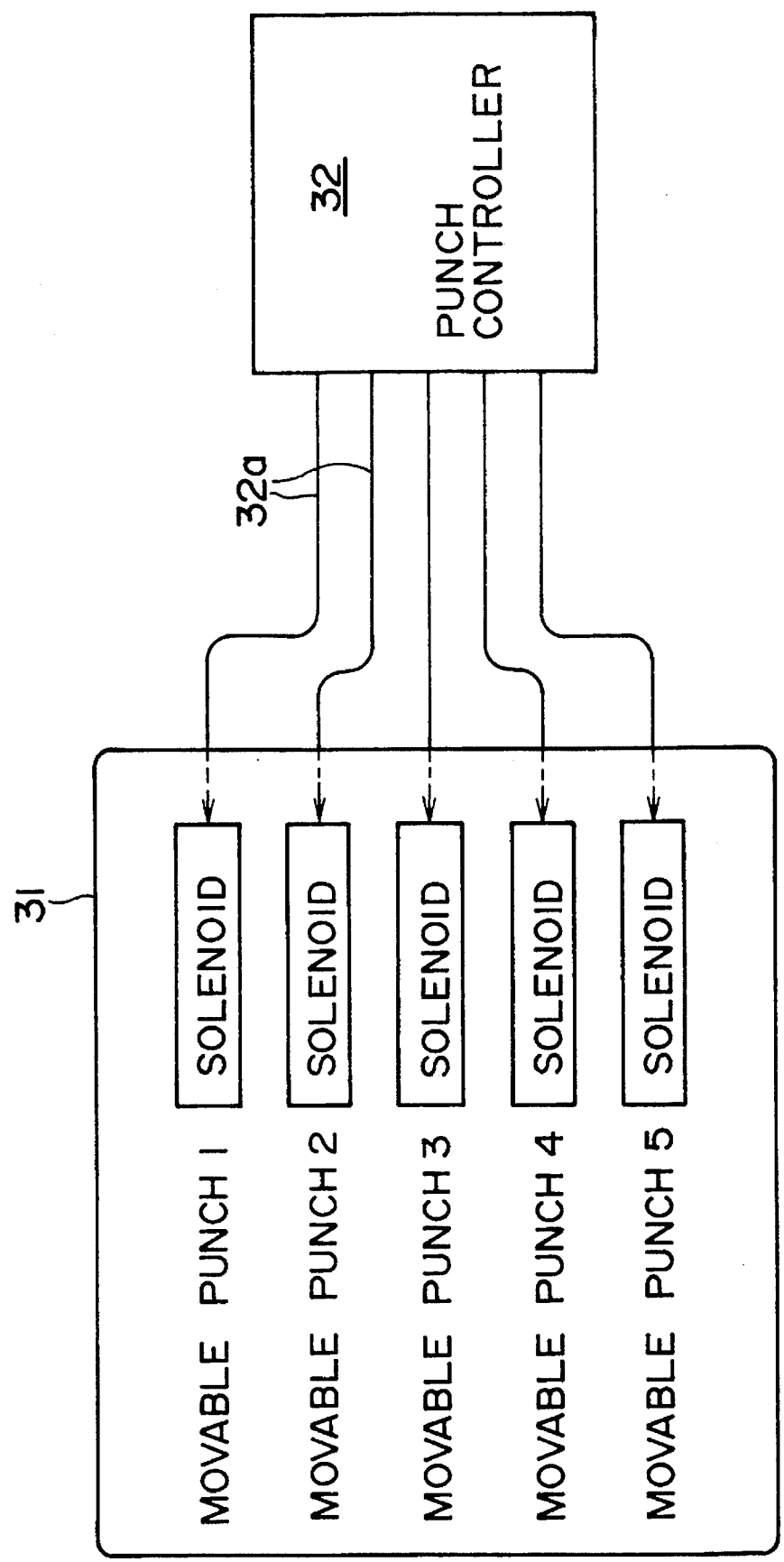

FIG. 5

| PUNCHING AND LAMINATING ORDER | 1 | 2 | 3 | 4 | 5 | 6 | 7 | 8 | 9 | 10 | 11 | 12 | ...... |
|---|---|---|---|---|---|---|---|---|---|---|---|---|---|
| MOVABLE PUNCH 1 | ○ | ● | ● | ● | ○ | ● | ● | ● | ● | ○ | ● | ● | ...... |
| MOVABLE PUNCH 2 | ● | ● | ○ | ○ | ● | ● | ● | ○ | ○ | ● | ● | ● | ...... |
| MOVABLE PUNCH 3 | ○ | ● | ● | ● | ● | ○ | ○ | ● | ● | ○ | ○ | ○ | ...... |
| MOVABLE PUNCH 4 | ● | ● | ● | ● | ● | ● | ● | ● | ○ | ● | ● | ● | ...... |
| MOVABLE PUNCH 5 | ● | ○ | ○ | ● | ● | ● | ○ | ○ | ● | ● | ○ | ○ | ...... |
| CONFIGURATION OF IRON PLATE | 30a 30b | 30c 30d | 30e 30a | 30b 30c | 30d 30e | 30a 30b | 30b 30c | 30c 30d | 30d 30e | 30e 30a | 30a 30b | 30a 30b | ........ |

● : OPERATING STATE OF MOVABLE PUNCH (PUNCH PUSHED OUT)

○ : NON-OPERATING STATE OF MOVABLE PUNCH (PUNCH WITHDRAWN)

METHOD OF MANUFACTURING AN IRON CORE OF A MULTI-PHASE LINEAR MOTOR

BACKGROUND OF THE INVENTION

The present invention relates to a method of manufacturing an iron core of a multi-phase linear motor including a hybrid type linear motor, a VR (variable reluctance) type linear motor and a permanent magnet type linear motor.

FIG. 9 is a longitudinal sectional view illustrating a cylindrical linear motor relating to the present invention.

In FIG. 9, each the stator iron cores 101, 102, 103 and 104 of a stator 100 of the cylindrical linear motor includes an outer peripheral portion formed into a stepped ring which is thick in the thickness direction thereof and an inner peripheral portion on which a plurality of stator teeth 105 are disposed at an equal pitch in the shaft direction. The stator iron cores 101, 102, 103 and 104 are supported by a frame 116 and housed therein.

The stator iron cores 101 and 102 are combined so that the outer peripheral portions thereof abut against each other to form a ring groove in which a ring winding 106 is disposed and held between the stator iron cores 101 and 102. Similarly, a ring winding 107 is disposed in a ring groove formed between the stator iron cores 103 and 104 and is held between the stator iron cores 103 and 104.

In the cylindrical linear motor, the stator iron plates 101 and 102 and the ring winding 106 constitute one phase and the stator iron plates 103 and 104 and the ring winding 107 constitute another phase to thereby constitute two phases as a whole.

A ring permanent magnet 108 is held between the stator iron cores 101, 102 and 103, 104 constituting the two phases and is magnetized in the shaft direction of a mover 109.

A mover iron core 110 of the mover 109 is cylindrical and a plurality of mover teeth 111 are disposed on an outer peripheral surface of the mover iron core 110 at an equal pitch in the shaft direction. The mover 109 is supported movably in the shaft direction through bearings 114 and 115 by brackets 112 and 113.

The stator teeth 105 and the mover teeth 111 have the following positional relationship: when the stator teeth 105 disposed on the stator iron core 104 are just opposite to the mover teeth 111, the stator teeth 105 disposed on the stator iron core 103 are shifted by 2/4 of the tooth pitch in the shaft direction with respect to the stator iron core 104. Further, the stator teeth 105 disposed on the stator iron core 102 are shifted by 1/4 of the tooth pitch in the shaft direction with respect to the stator iron core 104. The stator teeth 105 disposed on the stator iron core 101 are shifted by 3/4 of the tooth pitch in the shaft direction as compared with the stator iron core 104.

With the above configuration, the cylindrical linear motor constitutes a two-phase hybrid type linear motor.

However, the cylindrical linear motor configuration above has a drawback in that a winding accommodation portion cannot be made larger and the ampere-conductors per phase cannot be increased. Consequently, the driving force is low. Further, there is a drawback in that since the stator iron cores 101 and 104 are positioned farther from the permanent magnet 108 than the stator iron cores 102 and 103, the magnetic circuit is not uniform and the driving force varies depending on the excitation phase. Furthermore, since the phases are disposed in the shaft direction theoretically, the length of the motor in the shaft direction is made longer. In addition, since the permanent magnet 108 is disposed on the side of the stator 100, a motor casing is required and at the same time the length of the mover 109 in the shaft direction is required to be made longer than the length of the stator 100 in the shaft direction. Accordingly, there is a drawback in that the inertia of the mover 109 is increased. At the same time, there is a drawback in that it is difficult for this arrangement to constitute a multi-phase linear motor.

Accordingly, the present inventors have already proposed a linear motor which solves the above drawbacks and have disclosed the following shape for a stator iron plate forming a stator iron core.

When k is a positive integer and m is the number of phases, the stator iron plate forming the stator iron includes 2km salient poles including m salient poles forming tooth tops of the stator teeth and m salient poles forming tooth bottoms of the stator teeth in the inner periphery of the stator iron plate, both of which are both arranged side-by-side to form one set and is configured to have k sets of salient poles (Japanese Patent Provisional Publication Nos. 6-189520 and 6-197517 or Nos. 189520/1994 and 197517/1994).

Further, when k is an integer equal to or larger than 1, m is the number of phases, and n is an integer which is smaller than or equal to m/2 and is a value nearest to m/2, the stator iron plate includes km salient poles including n salient poles having a smaller inner diameter and (m−n) salient poles having a larger inner diameter at the tip of the salient poles opposite to the mover, both of as viewed from the mover which are arranged side-by-side to form one set and is configured to have k sets of salient poles (Japanese Patent Application No. 5-100810 or No. 100810/1993).

However, the linear motor configured as indicated above has the following problems.

(1) Since the teeth of the stator iron core or the mover iron core are formed by laminating the iron plates including the salient poles constituting the tooth tops and the salient poles constituting the tooth bottoms which are disposed in the predetermined relationship while rotating the iron plates by a predetermined angle, the salient poles must be disposed at an equal pitch in the circumferential direction and the motor cannot be formed into a flat plate or a semicircle.

(2) The external shape of the stator iron plate is also required to be the same when laminated and rotated and accordingly the external shape of the stator iron plate cannot be formed into a square in the case of a five-phase motor, for example.

SUMMARY OF THE INVENTION

The present invention has been made in view of the above problems and an object of the present invention is to solve the above problems and provide a method of manufacturing an iron core of a multi-phase linear motor, the shape of which is not restricted.

In order to achieve the above object, in the method of manufacturing an iron core of a multi-phase linear motor including a stator and a mover which are disposed opposite to each other and separated by an air gap, the stator or mover including a plurality of salient poles disposed along the air gap extending in a direction perpendicular to a moving direction of the mover, a multiplicity of teeth formed on surfaces of the salient poles opposite to the air gap at an equal pitch along the moving direction of the mover, and a stator iron core or mover iron core in which the stator teeth or mover teeth formed in the salient poles are disposed with a predetermined shift with respect to each other in the moving direction of the mover, the present invention is configured as follows:

The stator iron core or mover iron core is formed by punching iron plates constituting the iron core by means of a punching mold while selectively controlling actuation and withdrawl of movable punches included in the punching mold and disposed so as to be actuated and withdrawn toward and away from the salient poles by means of a punch controller so that tips of the salient poles form tooth tops or tooth bottoms of the teeth at a predetermined period for each punching of the iron plates and by laminating the punched iron plates successively.

In operation of the present invention, in the iron core manufacturing method of the multi-phase linear motor configured above, the iron plates are punched by selectively controlling actuation and withdrawal of the movable punches included in the iron plate punching mold and disposed in each of the salient poles to form the teeth, by means of the punch controller at the predetermined period for each punching and are laminated, so that the predetermined teeth can be formed in the laminating direction of the salient poles of the iron plates.

According to the present invention, it is not necessary to dispose the salient poles on the iron plates at an equal pitch in the circumferential direction and the shape of the motor is not restricted. In other words, even if the shape of the iron core of the motor resembles flat plates or a semicircle, the motor can be manufactured. Accordingly, it is not necessary to rotate and laminate the stator iron plates or mover iron plates.

BRIEF DESCRIPTION OF THE DRAWINGS

FIGS. 3(a) 3(f) are plan views of stator iron plates forming a stator core wherein FIGS. 3(a), 3(b), 3(c), 3(d), 3(e) and 3(f) are diagrams showing examples of tooth tops or tooth bottoms for forming stator teeth and which are formed at the tips of salient poles;

FIG. 4 shows an embodiment of the iron core manufacturing method of the multi-phase linear motor of the present invention and is a schematic diagram illustrating a portion for controlling movable punches included in a punching mold of iron plates;

FIG. 5 is a diagram showing a relationship of the punching and laminating order of stator iron plates used in the control of FIG. 4 and control states of the movable punches;

FIGS. 6(a) and 6(b) are schematic diagrams illustrating a control state of the movable punch included in the punching mold, wherein FIG. 6(a) shows its operating state and FIG. 6(b) shows its non-operating state;

FIGS. 8(a)–8(e) are plan views of iron plates forming another stator core according to a modification of FIG. 3 wherein FIGS. 8(a), 8(b), 8(c), 8(d) and 8(e) show examples of tooth tops or tooth bottoms for forming the stator teeth and formed at the tips of the salient poles.

DESCRIPTION OF A PREFERRED EMBODIMENT

A preferred embodiment of the present invention is now described in detail with reference to the accompanying drawings.

Figure 1:
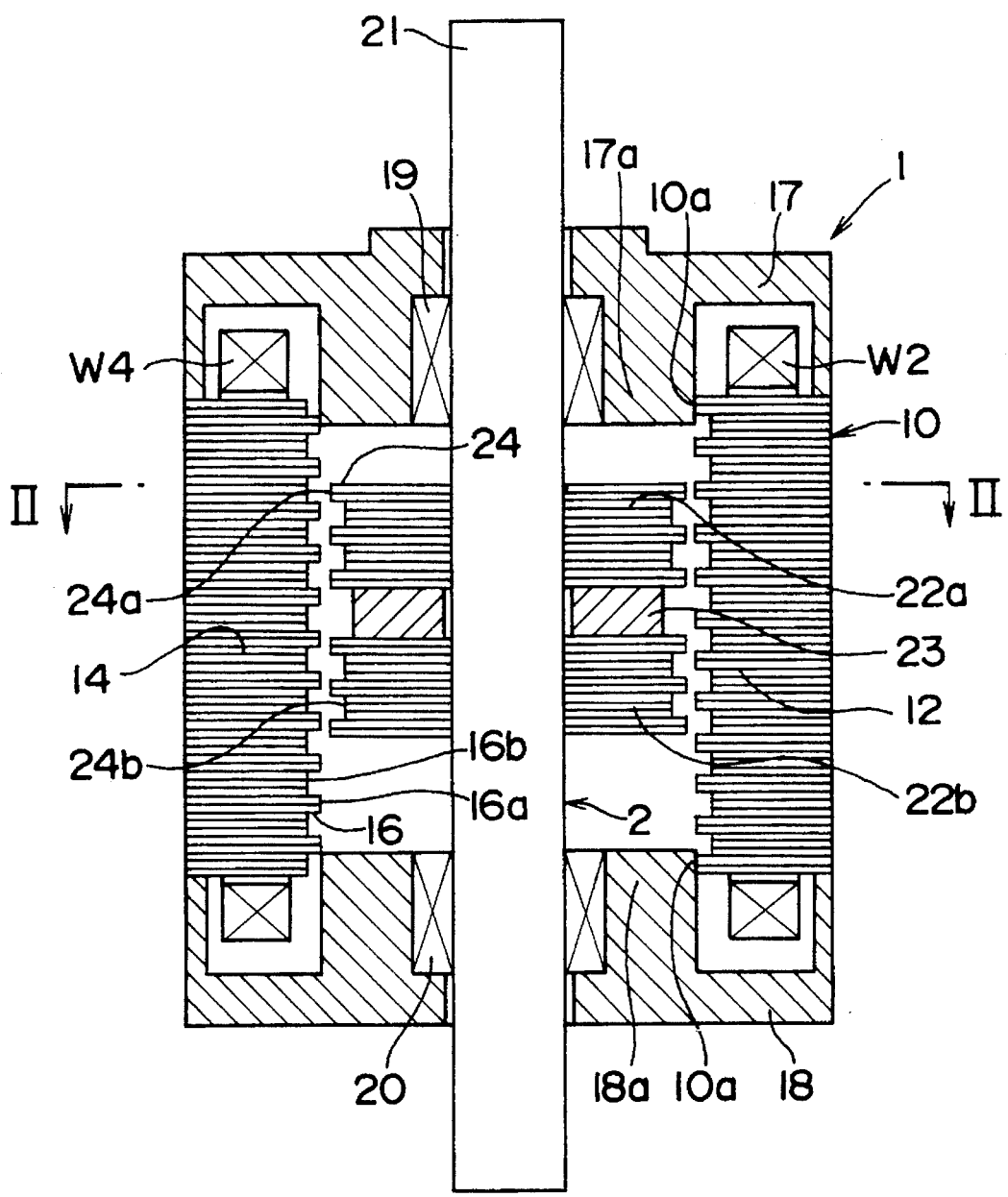
FIG. 1 is a longitudinal sectional view illustrating a linear motor according to an embodiment of the present invention.
Figure 2:
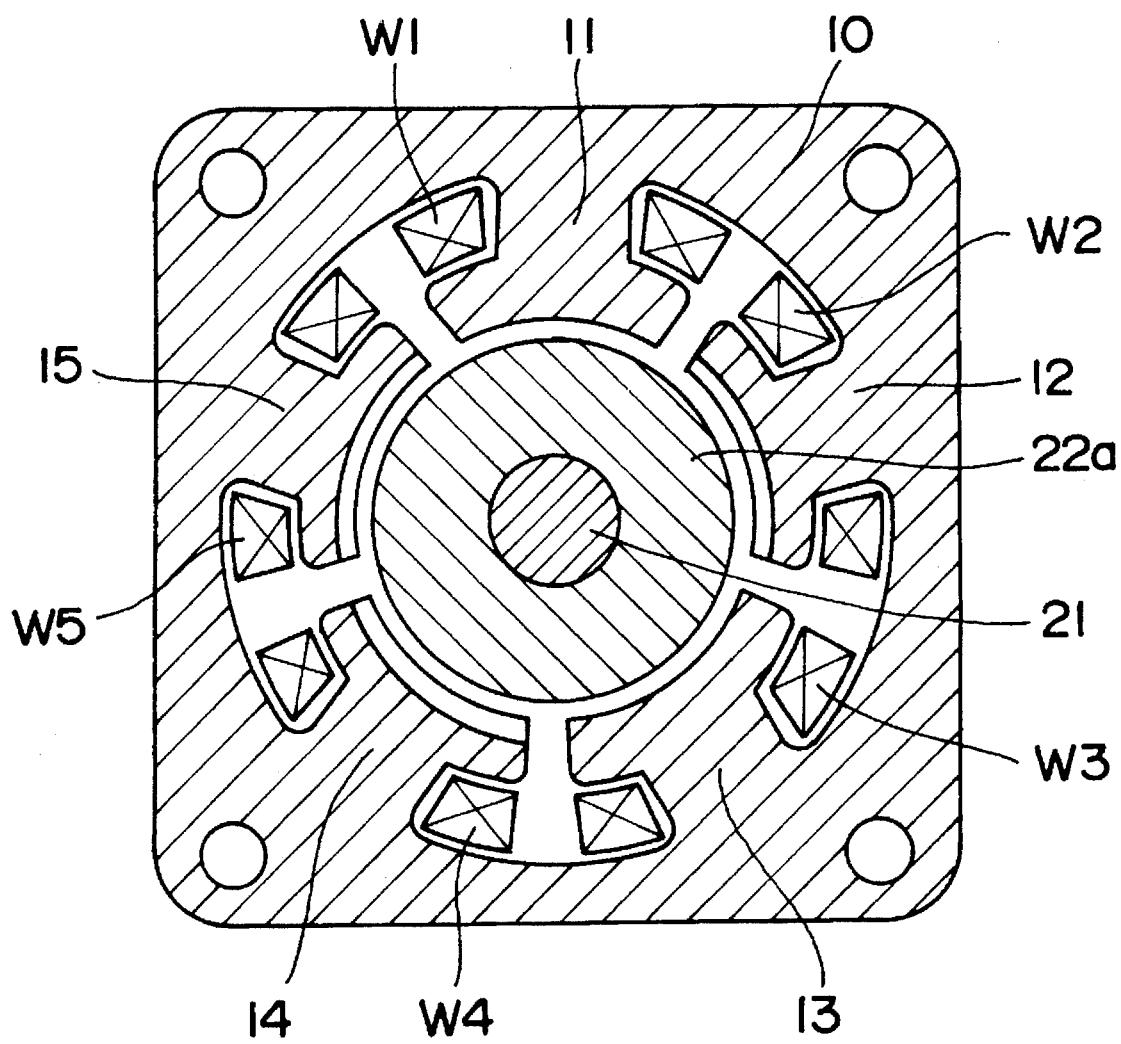
FIG. 2 is a sectional view taken along line II—II of FIG. 1.

FIG. 1 is a longitudinal sectional view illustrating a multi-phase linear motor according to an embodiment of the present invention and FIG. 2 is a transverse sectional view taken along line II—II of FIG. 1.

In FIGS. 1 and 2, a plurality of stator teeth 16 (tooth tops 16a and tooth bottoms 16b) are disposed at an equal pitch on inner peripheral surfaces of five salient poles 11, 12, 13, 14 and 15 disposed in a square stator iron core 10 of a stator 1 at an equal angle pitch. Stator windings W1, W2, W3, W4 and W5 are wound on the five salient poles 11, 12, 13, 14 and 15, respectively.

Inner diameter portions 10a formed at both ends of the stator iron core 10 in the shaft direction are defined as fitting holes, and fitting portions 17a and 18a formed in end brackets 17 and 18 are fitted into the inner diameter portions 10a.

On the other hand, a mover 2 disposed within the stator 1 in opposing relationship to the stator 1 and separated therefrom by an air gap, is supported through bearings 19 and 20 by the brackets 17 and 18 movably in the shaft direction. Disposed on a shaft 21 of the mover 2 are magnetic pole iron cores 22a and 22b and a ring permanent magnet 23 held between the magnetic pole iron cores 22a and 22b and magnetized in the shaft direction. A plurality of mover teeth 24 (tooth tops 24a and tooth bottoms 24b) are disposed on outer peripheral surfaces of the magnetic pole iron cores 22a and 22b in opposing relationship with respect to the stator teeth 16 and at an equal pitch in the shaft direction. An arrangement of the mover teeth is shown in FIG. 1.

FIGS. 3(a) to 3(f) illustrate examples of stator iron plates 30a, 30b, 30c, 30d, 30e and 30f constituting the stator iron core 10. In FIGS. 3(a) to 3(f), the tips of the salient poles P1, P2, P3, P4 and P5 of the stator iron plates 30a, 30b, . . . 30f are punched in accordance with a periodically repeated order by movable punches included in a punching mold not shown the movable punches being actuatable out toward each of the salient poles P1, P2, P3, P4 and P5 and withdrawable therefrom to form the shapes as shown in (a), (b), (c), (d), (e), (a), (b), (c), . . . of FIG. 3 for each punching of the iron plate, so that the tooth tops 16a or the tooth bottoms 16b of the stator teeth 16 are formed at the tips of the salient poles P1, P2, . . . P5.

Figure 3A:
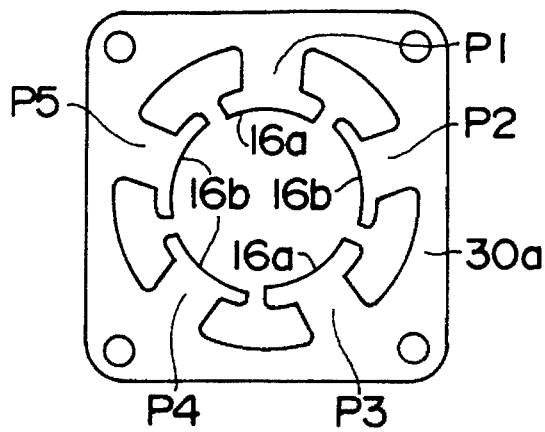

The stator iron plate 30a shown in FIG. 3(a) is punched by setting movable punches 1 and 3 associated with the salient poles P1 and P3 to a non-operating state and setting movable punches 2, 4 and 5 associated with the other salient poles P2, P4 and P5 to an operating state so that the tooth tops 16a are formed at the tips of the salient poles P1 and P3 and the tooth bottoms 16b are formed at the tips of the salient poles P2, P4 and P5.

Figure 3B:
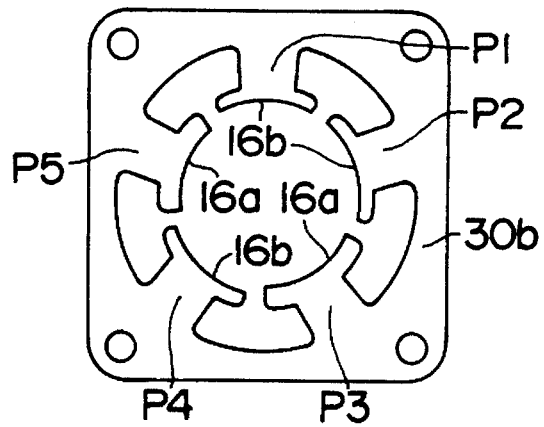

The stator iron plate 30b shown in FIG. 3(b) is punched by setting the movable punches 3 and 5 associated with the salient poles P3 and P5 to the non-operating state and setting the movable punches 2, 4 and 1 associated with the other salient poles P2, P4 and P1 to the operating state so that the tooth tops 16a are formed at the tips of the salient poles P3 and P5 and the tooth bottoms 16b are formed at the tips of the salient poles P2, P4 and P1.

Figure 3C:
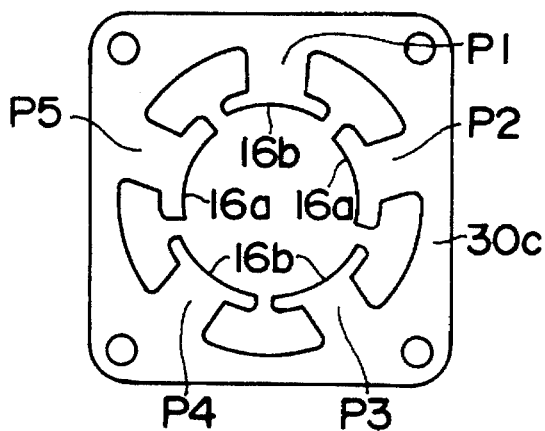
Figure 3D:
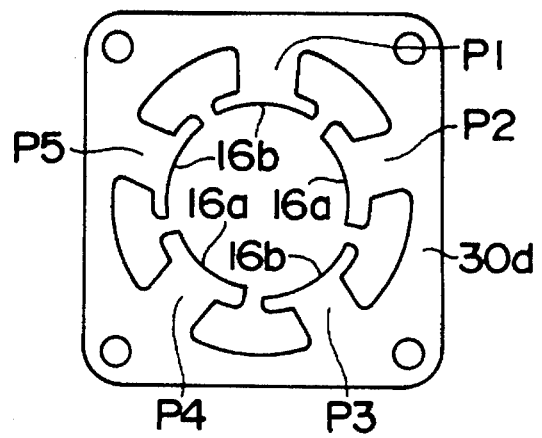
Figure 3E:
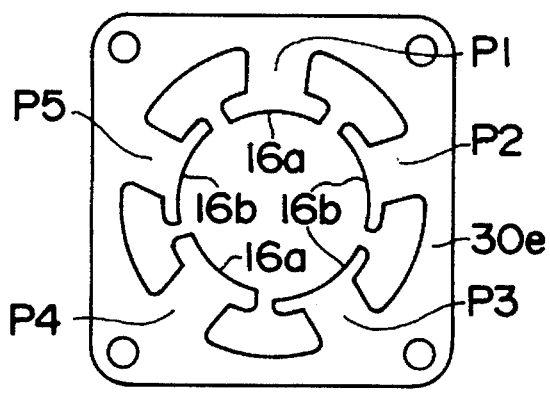
Figure 3F:
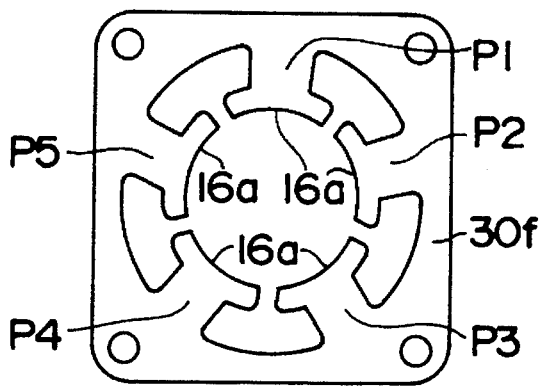

Similarly, stator iron plates 30c, 30d and 30e shown in FIGS. 3(c), 3(d) and (3e) are punched by setting the movable punches 1, 2, ... 5 associated with the salient poles P1, P2, ... P5 to the non-operating state or the operating state selectively so that the predetermined tooth tops 16a and tooth bottoms 16b are formed at the tips of the salient poles P1, P2, ... P5. The stator iron plate 30f shown in FIG. 3(f) is punched by setting all of the movable punches 1, 2, ... 5 associated with the salient poles P1, P2, ... P5 to the non-operating state.

Accordingly, when the stator iron core 10 is formed, the punched stator iron plates 30a, 30b, 30c, 30d and 30e are laminated in the order of the description thereof, so that the stator teeth 16 with one pitch can be formed at the tips of the salient poles P1, P2, ... P5.

Further, when the inner diameter portions 10a and 10b disposed at both ends of the stator iron core 10 are used in the fitting holes of the end brackets 17 and 18, several iron plates laminated at both ends can be constituted by the stator iron plate 30f.

FIGS. 4 to 6 illustrate an embodiment of a manufacturing method of an iron core of the multi-phase linear motor.

FIG. 4 is a schematic diagram illustrating a portion for controlling a movable punch of a punching mold. In FIG. 4, the movable punches 1, 2, ... 5 included in the punching mold 31 are actuatable out toward the salient poles P1, P2, ... P5 and are withdrawable therefrom under the control of solenoids which are selectively operated in the order shown in FIG. 5 by a punch controller 32 so that the tooth tops 16a or the tooth bottoms 16b of the stator teeth 16 are formed at the tips of the salient poles P1, P2, ... P5 of the stator iron plates 30 constituting the stator iron plate 10. In FIG. 4, numeral 32a denotes connecting leads.

FIG. 5 is a diagram showing a relation of a punching and laminating order of the stator iron plates 30a, 30b, 30c, 30d and 30e and control states of the movable punches 1, 2, ... 5. In operation of the movable punches 1, 2, ... 5 of FIG. 5, the mark ● represents the operating state of the punch (the punch is pushed out) for forming the tooth bottom 16b the and mark ○ represents the non-operating state of the punch (the punch remains withdrawn) for forming the tooth top 16a.

Figure 6A:
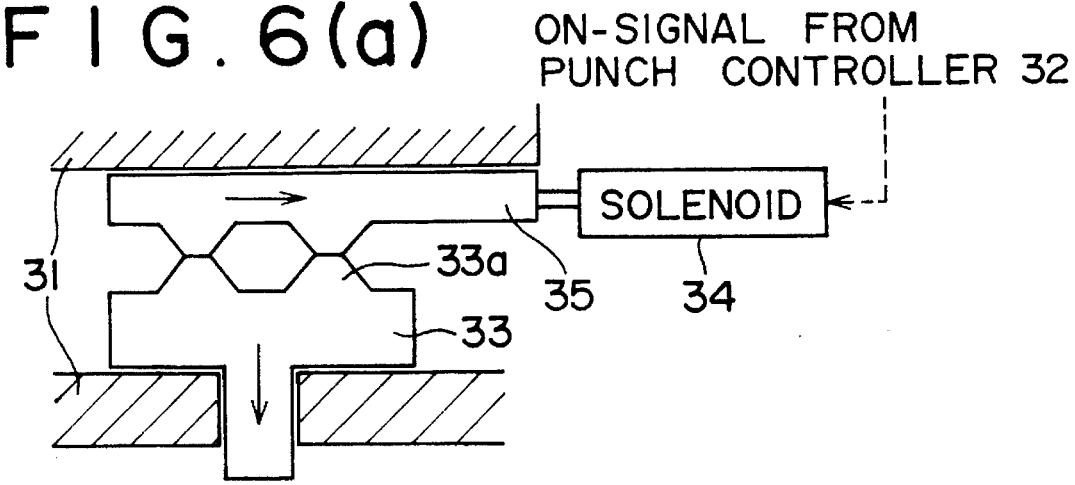
Figure 6B:
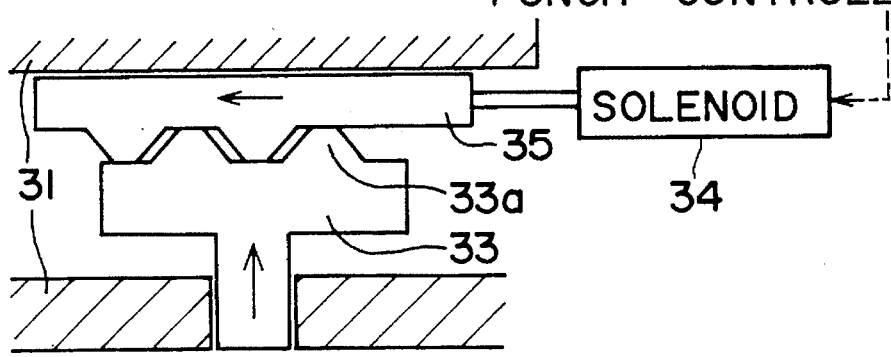

FIGS. 6(a) and 6(b) are diagrams for easily understanding control states of any one of the movable punches 33 included in the movable punches 1, 2, ... 5. FIG. 6(a) shows its operating state and FIG. 6(b) shows its non-operating state.

In FIG. 6(a) and 6(b), the movable punch 33 is disposed in the punching mold 31 movably in the vertical direction in FIGS. 6(a) and 6(b) and includes a cam 33a formed on an upper surface thereof and which abuts against a cam member 35 which is driven in the right direction in FIGS. 6(a) and 6(b) by means of energization of the solenoid 34.

When an ON signal from the punch controller 32 is supplied to the solenoid 34, the solenoid 34 is energized to drive the cam member 35 in the right direction. When a protrusion of the cam member 35 abuts against a protrusion of the cam 33a of the movable punch 33 by the driving of the cam member 35, the movable punch 33 prodrudes from the surface of the punching mold 31 and achieves the operating state shown in FIG. 6(a).

Further, when an OFF signal from the punch controller is supplied to the solenoid 34, the solenoid 34 is deenergized to return the cam member 35 in the left direction by means of returning means not shown. When the cam member 35 is returned, the protrusions of both cams are disengaged and the movable punch 33 is retracted from the surface of the punching mold 31 by means of returning means not shown to achieve the non-operating state shown in FIG. 6(b).

Figure 7:
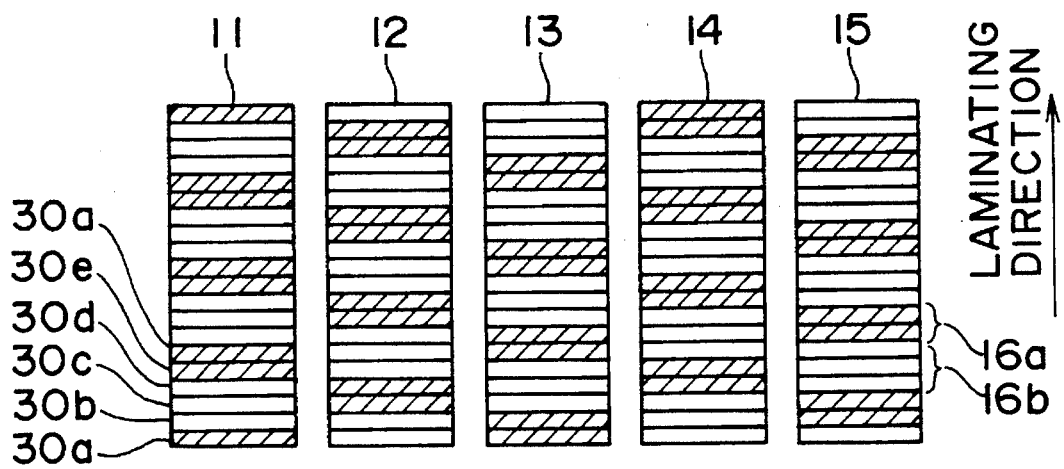
FIG. 7 is an expanded view of the stator teeth formed by successively laminating the stator iron plates of FIG. 3 in the laminating order shown in FIG. 5 as viewed from the mover.
Figure 8A:
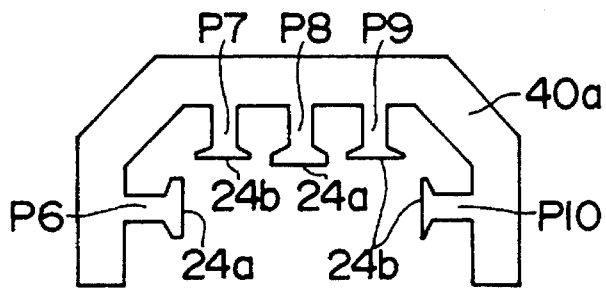
Figure 8B:
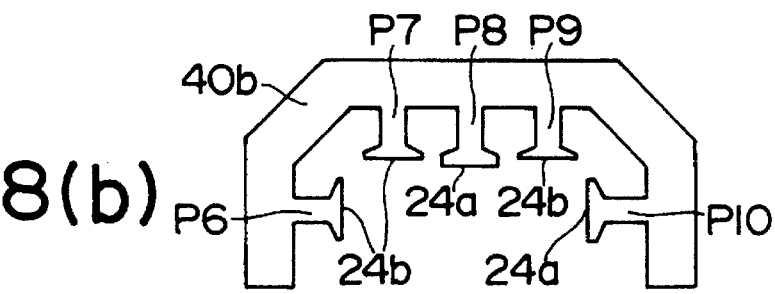
Figure 8C:
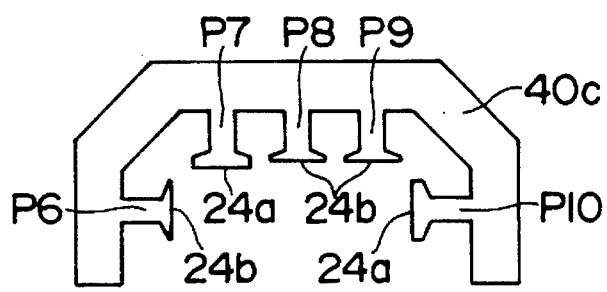
Figure 8D:
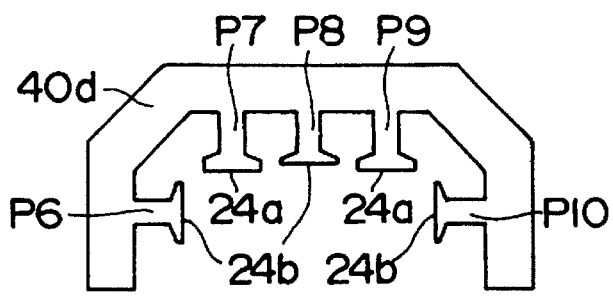
Figure 8E:
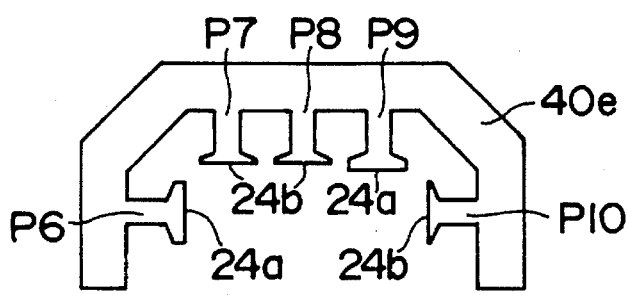
Figure 9:
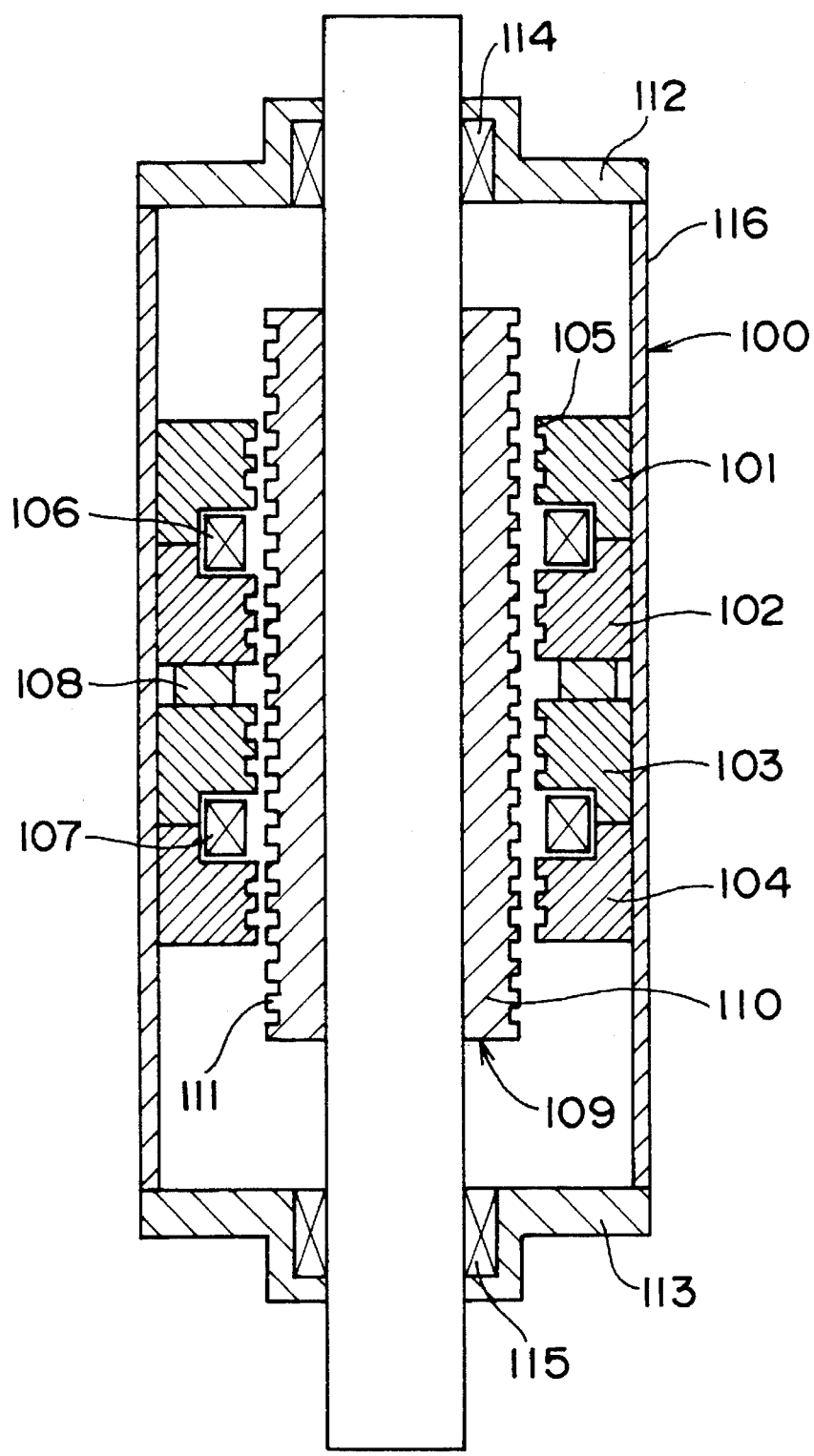
FIG. 9 is a longitudinal sectional view of a cylindrical linear motor relating to the present invention.

FIG. 7 shows the stator teeth 16 of the salient poles 11, 12, 13, 14 and 15 formed by laminating the stator iron plates 30a, 30b, 30c, 30d and 30e punched as described above sequentially in the laminating order shown in FIG. 5 as viewed from the mover 2. Hatched portions represent the tooth tops 16a and blank or unhatched portions represent the tooth bottoms 16b.

FIGS. 8(a) to 8(e) are plan views of mover iron plates 40a, 40b, 40c, 40d and 40e showing a modification of the embodiment. The mover iron plates are used for a mover iron core of a motor having an external shape resembling a flat plate. The number of phases, the number of salient poles and the shift of the teeth between the adjacent salient poles are the same as those of the embodiment in order to easily understand the mover iron plates.

Accordingly, in the same manner as described above, the mover iron plates 40 are punched repeatedly in the order of the mover iron plates 40a, 40b, 40c, 40d and 40e by selectively controlling outward actuation and withdrawl of the movable punches included in the punching mold and disposed for outward actuation and withdrawl to and from the salient poles P6, P7, ... P10 by means of the punch controller and are laminated successively to form the mover iron core.

A multiplicity of mover teeth 24 can be formed in the laminating direction of the iron plates at the end surfaces of the salient poles formed in the mover iron core. The configuration of the mover teeth 24 as viewed from the stator 1 is the same as shown in FIG. 7.

In addition, there are iron plates for a mover iron core used in a motor having an external shape resembling a semicircle and iron plates for a stator iron core used in a motor having an external shape resembling a flat plate or a semicircle.

In the above embodiments, the plurality of salient poles are formed on the side of the mover iron core, while it is relative to decide that any one of the iron cores opposite to each other and separated by an air gap is the stator and the other is the mover, and any of them can be any of the stator and the mover.

Further, it is apparent that the manufacturing method of the iron core of the present invention is not limited to the multi-phase linear motor shown in the preferred embodiment and can be applied to another linear motor having an iron core in which teeth are formed in the laminating direction of the iron plates.

The technique of the present invention is not limited to the technique of the embodiments and may include other means for achieving the same function. Further, the technique of the present invention can be modified and added variously within the scope of the above configuration.

As apparent from the above description, according to the manufacturing method of the iron core of the multi-phase linear motor of the present invention, in manufacturing of the iron core of the multi-phase linear motor in which the stator and the mover are disposed opposite to each other and are separated by an air gap and wherein the multiplicity of teeth are formed at the end surface of the plurality of salient poles disposed in the stator or the mover, the stator iron core or the mover iron core is formed by punching the iron plates forming the iron core by means of the movable punches included in the punching mold and disposed by a punch controller so as to be selectively actuatable toward and withdrawable from the tips of the salient poles to form the tooth tops or the tooth bottoms of the teeth periodically for each punching of the iron plates and by laminating the punched iron plates successively. Accordingly, it is not necessary to dispose the salient poles at an equal pitch in the circumferential direction in the iron plates as in the prior art and the shape of the motor is not restricted. In other words, even the stator iron core or the mover iron core for motors having an iron core and having an external shape resembling a flat plate or a semicircle can be manufactured. Accordingly, it is not necessary to rotate and laminate the stator iron plates or the mover iron plates.

Further, since the rotation and lamination are required in the prior art, the external shape of the iron plate must be circular in the case of other motors except the two-phase motor and the four-phase motor and when the motor is configured so that screws used in the assembly of the motor are not exposed externally of the motor, it is necessary to increase a thickness of the iron plate yoke portion correspondingly. Consequently, there is a problem that the winding space and the external diameter of the mover are made smaller and the driving force is reduced. However, according to the present invention, the external shape of the motor can be square or the like irrespective of the number of phases of the motor and screws can be disposed within the iron core without reduction of the winding space and the external diameter of the mover.

We claim:

1. A method of manufacturing iron cores of a multi-phase linear motor comprising a stator and a mover which are disposed facing each other with an air gap therebetween and each of which comprises at least one iron core, either of said stator or mover having a plurality of salient poles which are disposed along the air gap and which extend in a direction perpendicular to a moving direction of said mover, the salient poles on the iron core having a multiplicity of teeth disposed at equal pitches along the moving direction of the mover, using a punching apparatus which comprises a punching controller and a punching mold having a plurality of movable punches which are controlled independently of each other by the punching controller, said method comprising the steps of:

selectively controlling the movable punches in the punching mold so that selectively chosen ones of said movable punches are pushed out while other ones of said movable punches remain withdrawn in correspondence with a desired shape of an iron plate forming said iron core by means of the punching controller, punching an iron plate using a configuration of movable punches as controlled in said step of selectively controlling the movable punches, so that said selectively chosen ones of said movables punches generate bottoms of said teeth, while said other ones of said movable punches permit creation of tops of said teeth during said step of punching, repeating the step of selectively controlling the movable punches so as to selectively vary or maintain the configuration of the movable punches and the step of punching an iron plate, and laminating punched iron plates successively to form said iron core.

2. The method according to claim 1, wherein the iron plates which from the stator core have a total of 2km salient poles which consist of k sets of m salient poles forming a tooth top and m salient poles forming a tooth bottom wherein m is the number of phases and k is a positive integer.

3. The method according to claim 1, wherein the iron plates which form the stator core have km salient poles consisting of k sets of n salient poles at a first distance from the mover and m–n salient poles at a larger distance from the mover wherein m is the number of phases, k is a positive integer, n is an integer equal to or less than m/2 and closest to m/2.

4. The method according to claim 1, wherein each of said movable punches is associated with a respective one of said salient poles, said step of punching including the step of punching away a distal end of any one of said salient poles associated with said selectively chosen movable punches.

5. The method of claim 1, wherein said step of repeating and laminating are carried out such that said step of laminating involves laminating at least three different configurations of iron plates, each different configuration of iron plates corresponding to a different configuration of selectively chosen movable punches.

6. The method of claim 1, wherein said steps of repeating and laminating are carried out such that said step of laminating involves laminating two iron plates having identical configurations and three iron plates having a configuration different from that of said two iron plates, each configuration of iron plates corresponding to a different configuration of selectively chosen movable punches.

* * * * *